Nov. 4, 1924.  
F. H. BANBURY  
MACHINE FOR TREATING AND SHEETING PLASTIC MATERIAL  
Filed Feb. 15, 1924
1,513,733
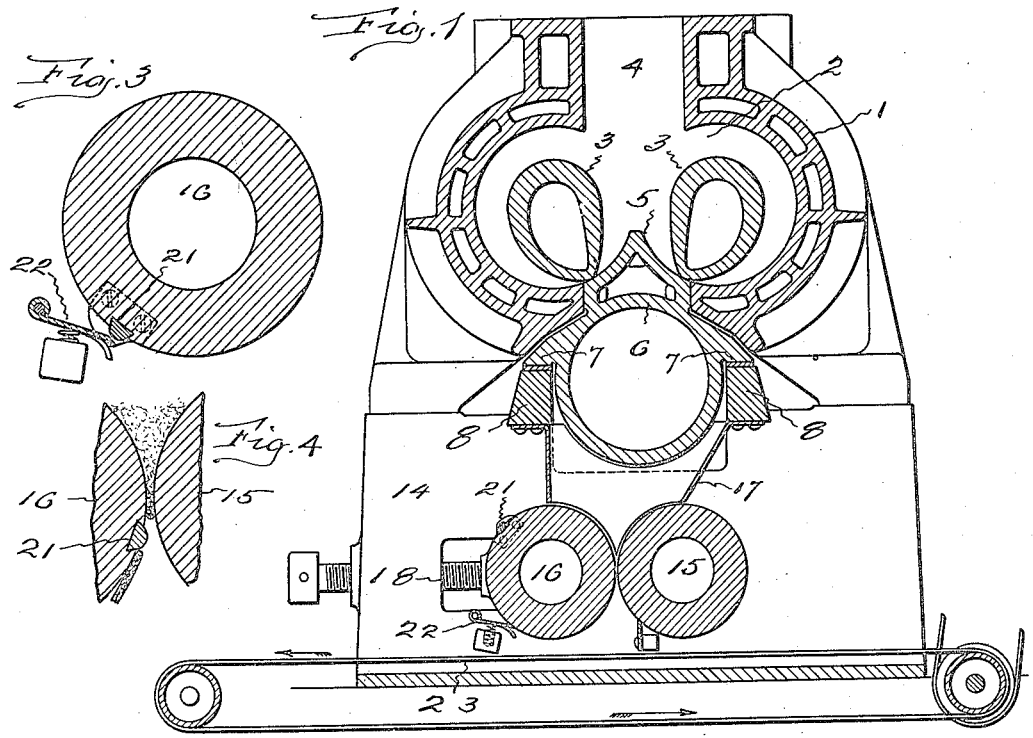
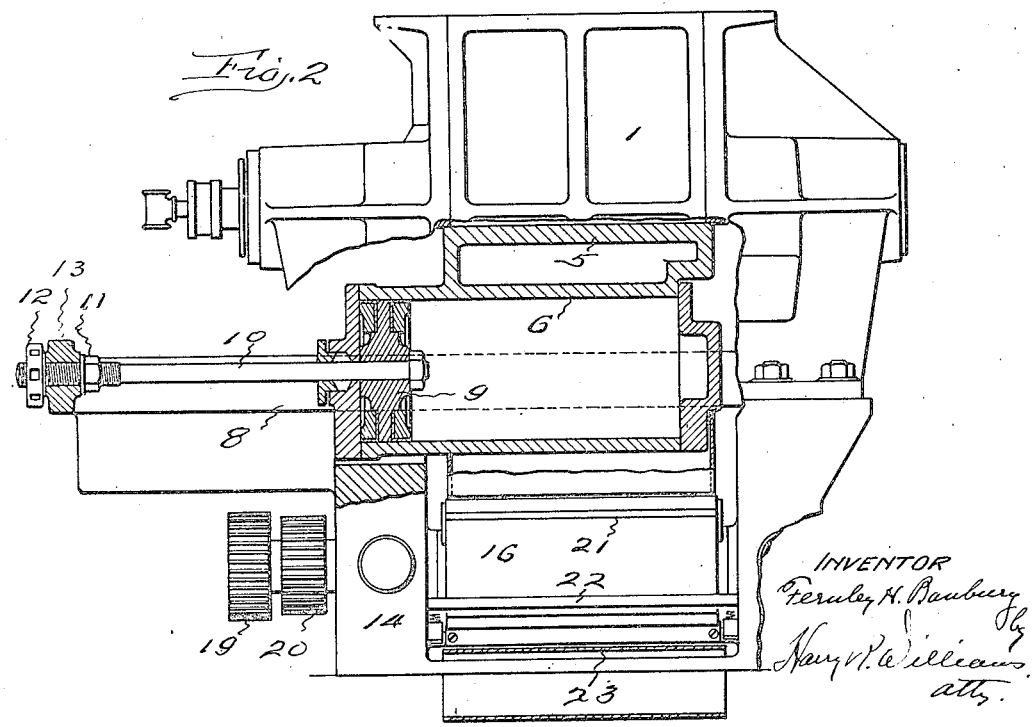

Patented Nov. 4, 1924.

1,513,733

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION OF CONNECTICUT.

MACHINE FOR TREATING AND SHEETING PLASTIC MATERIAL.

Application filed February 15, 1924. Serial No. 693,107.

*To all whom it may concern:*

Be it known that I, FERNLEY H. BANBURY, a citizen of the United States, residing at Ansonia, in the county of New Haven and State of Connecticut, have invented a new and useful Improvement in Machines for Treating and Sheeting Plastic Material, of which the following is a specification.

This invention relates more particularly to the delivery mechanisms of machines for treating plastic material, such as rubber, of the type that have a casing containing a chamber in which are one or more rotors designed when rotated to break up, crush, knead, and masticate the stock that is fed into the chamber. The treated material is discharged from the masticating chamber in the constituency of sticky lumps or a gummy mass and more or less hot. In order that this material thus discharged be put into shape convenient for future use it was formerly taken to and passed between sheeting cylinders designed to reduce the lumps or mass to sheets of substantially uniform thickness, which sheets prior to my invention, were cut with a knife by hand while on a sheeting roll, and separated into slabs of varying sizes and length and containing a greater or less quantity of stock. When cut with a sharp knife unless this plastic material is completely separated on the line of cut and the edges drawn apart, owing to the adhesive nature of the material, the cut edges tend to reunite and obliterate the cut.

The object of the present invention is to provide means in connection with the masticating rotors and sheeting cylinders of machines of the type referred to for treating plastic material of the nature mentioned, which will ensure the complete severance and isolation of the material along the line of separation in such manner that the joints will not reunite, and deliver the material separated in sections or slabs of practically the required length and size to contain the necessary amount of material for subsequent operations to which the material is to be subjected, for instance, calendering or tubing, or in segregated sheets of a size convenient for handling and storing while the material is ageing.

The general features of the machine were illustrated and described by me in Patent No. 1,449,930, issued March 27, 1923.

In the accompanying drawings Fig. 1 shows a vertical section of the lower portion of an internal rubber mixing machine provided with cylinders, severing means and delivery conveyor, constructed to carry out the present invention. Fig. 2 is a front elevation with a portion cut in longitudinal section of the lower part of the machine. Fig. 3 is a transverse section of the sheeting cylinder that is provided with the means for severing the sheeting material into slabs. Fig. 4 is a detail section showing the relation of the sheeting cylinders, severing means and the material passing between them and being separated.

The water-jacketed casing 1 of the machine shown has a chamber 2 in which water-cooled kneading rotors 3 are rotarily mounted. Stock is fed to the kneading chamber in order that it may be treated by the action of the rotors through the neck 4 in the usual manner of operating these machines.

Movably fitting an opening in the bottom of the chamber and extending longitudinally therewith is a door 5 which is desirably made water-cooled. The upper surface of this door is shaped to conform to the walls of the mixing chamber. This door is mounted on a cylinder 6 which has flanges 7 that slidably rest upon ways 8 so that the cylinder and door are capable of longitudinal movement for opening and closing the discharge opening from the chamber. Fitted in the door cylinder of the machine shown is a piston 9 that is secured to a rod 10 which is fastened at its outer end by nuts 11 and 12 to a cross bar 13 attached to the outer ends of the ways upon which the cylinder and door slide. When fluid pressure is admitted to one end of the cylinder the cylinder is forced in one direction so that the door will close the discharge outlet from the chamber. When fluid pressure is admitted to the other end of the cylinder the cylinder is forced in the opposite direction and the door carried so as to open the discharge outlet from the mixing chamber.

Rotarily mounted in the frame 14 below the discharge opening from the mixing chamber are sheeting cylinders 15 and 16. These cylinders extend parallel with and beneath the discharge opening and are desirably designed to be the same size. A hopper 17 is arranged to direct material which is discharged through the opening from the chamber to the space between the sheeting cylinders. Means such as a screw 18 may be provided to adjust the relation of the sheeting cylinders to each other. Any suitable means may be provided to rotate these sheeting cylinders, such as the gears 19 and 20, one of which may be larger than the other so as to drive one cylinder faster than the other.

The cylinder 16 has on its periphery a strip 21 which extends longitudinally to its axis and projects out beyond its surface. As this strip extends beyond the surface of the cylinder on which it is mounted, during its revolution it comes in contact with the other cylinder and jams or squeezes and spreads apart the plastic material which is being fed between the cylinders. This strip which acts as a severing blade is not sharp, in order that it may effect a substantial separation when it is dividing off a section of the sheeted material from the following plastic mass, and as the cylinder which carries the separating strip preferably travels somewhat faster than the other cylinder, its action assists in causing a separation between the severed edge of the piece that has been advanced and the material which is following. A stripper 22 is desirably arranged adjacent to the surface of the cylinder carrying the severing strip so as to prevent the material from adhering to and continuing around this cylinder.

Arranged below the sheeting cylinders is a conveyor 23, shown in the form of an endless belt or traveling apron, which is designed to receive the material which has been sheeted and severed. Preferably this conveyor has a slightly faster surface speed than the cylinder with the severing strip, and this also assists in drawing the piece which is severed away from the material which follows.

With this mechanism the plastic mass which is discharged from the mixing or kneading machine is delivered at the desired times to the sheeting cylinders and rolled into a sheet of the desired thickness, and the sheet which is formed is severed into sections or slabs which are carried away and which contain just the desired quantity in each to enable the piece cut off and delivered to be used for subsequent treatment, or are in convenient form for storing and curing. Owing to the fact that the severing strip is blunt and not sharp the mass of plastic material is crushed and squeezed apart, and the strip in itself separates the edges on the dividing line so that they will not adhere and obliterate the cut. Furthermore as mentioned, if the sheeting cylinder with the severing strip travels at a faster surface speed than the other sheeting cylinder this tends to further spread the separated edges, and then if the belt travels faster than the cylinder with the strip this also tends to draw the severed section or slab away from the mass following, consequently a complete wide isolation of the separated edges of the material is ensured. Where the separation is made in this way the mechanism can be adjusted in such manner that each piece or slab that is severed can be made to contain exactly the necessary quantity to produce the desired result in the machine subsequently used on the material.

The invention claimed is:—

1. In combination with the discharge from a machine for treating plastic material, of cylinders arranged to receive and form into sheets plastic material discharged from the machine, means attached to and extending axially on the periphery of one of said cylinders for severing the mass being sheeted into slabs, and a conveyor adjacent to the cylinders for receiving the severed slabs and conducting them away.

2. In combination with the discharge from a machine for treating plastic material, of cylinders arranged to receive and form into sheets plastic material discharged from the machine, a strip attached to and extending out from the periphery of one of said cylinders for severing the mass being sheeted into slabs, and a conveyor adjacent to the cylinders for receiving the severed slabs and conducting them away.

3. In combination with the discharge from a machine for treating plastic material, a pair of cylinders arranged to receive and form into sheets plastic material discharged from the machine, one of said cylinders being rotated faster than the other, a strip attached to and extending out from the periphery of the faster rotating of said cylinders, for severing the mass being sheeted into slabs, and a conveyor adjacent to the cylinders for receiving the severed slabs and conducting them away.

4. In combination with the discharge from a machine for treating plastic material, a pair of cylinders arranged to receive and form into sheet plastic material discharged from the machine, one of said cylinders being rotated faster than the other, a strip attached to and extending out from the periphery of the faster rotating of said cylinders, for severing the mass being sheeted into slabs, and a conveyor adjacent to the cylinders for receiving the severed slabs and conducting them away, said conveyor having a faster surface speed than the surface speed of the cylinder with the severing strip.

5. In combination with the discharge from a machine for treating plastic material, a pair of cylinders arranged to receive and form into sheets plastic material discharged from the machine, a strip with a blunt outer edge mounted on the periphery of one of said cylinders, for severing the mass being sheeted into slabs, and a conveyor adjacent to the cylinders for receiving the severed slabs and conducting them away.

FERNLEY H. BANBURY.